United States Patent
Toda

(10) Patent No.: US 9,299,131 B2
(45) Date of Patent: Mar. 29, 2016

(54) NOISE REDUCTION APPARATUS, NOISE REDUCTION METHOD, AND COMPUTER-READABLE STORAGE MEDIUM

(75) Inventor: Masato Toda, Tokyo (JP)

(73) Assignee: NEC Corporation, Tokyo (JP)

( * ) Notice: Subject to any disclaimer, the term of this patent is extended or adjusted under 35 U.S.C. 154(b) by 68 days.

(21) Appl. No.: 14/239,577

(22) PCT Filed: Aug. 21, 2012

(86) PCT No.: PCT/JP2012/071072
§ 371 (c)(1),
(2), (4) Date: Feb. 19, 2014

(87) PCT Pub. No.: WO2013/027723
PCT Pub. Date: Feb. 28, 2013

(65) Prior Publication Data
US 2014/0205202 A1  Jul. 24, 2014

(30) Foreign Application Priority Data
Aug. 22, 2011  (JP) .................................. 2011-180637

(51) Int. Cl.
*G06K 9/40* (2006.01)
*G06T 5/00* (2006.01)
*H04N 1/409* (2006.01)

(52) U.S. Cl.
CPC ................ *G06T 5/002* (2013.01); *H04N 1/409* (2013.01); *G06T 2207/20016* (2013.01); *G06T 2207/20076* (2013.01)

(58) Field of Classification Search
CPC ........... G06T 5/001; G06T 5/002; G06T 5/20; G06K 9/40; H04N 7/26888; H04N 1/4097
See application file for complete search history.

(56) References Cited

U.S. PATENT DOCUMENTS

| | | | |
|---|---|---|---|
| 6,885,397 B1 * | 4/2005 | Ducourant .................... | 348/243 |
| 7,508,430 B1 * | 3/2009 | Oten et al. ..................... | 348/242 |
| 7,570,832 B2 * | 8/2009 | Chui et al. .................... | 382/260 |
| 7,602,438 B2 * | 10/2009 | McGarvey et al. ........... | 348/362 |
| 7,860,167 B2 * | 12/2010 | Le Dinh et al. ............ | 375/240.2 |
| 8,351,735 B2 * | 1/2013 | Biezen et al. ................. | 382/274 |
| 8,817,120 B2 * | 8/2014 | Silverstein et al. ........ | 348/220.1 |
| 8,953,882 B2 * | 2/2015 | Lim et al. ...................... | 382/168 |
| 2014/0056536 A1 * | 2/2014 | Zamyatin et al. ............. | 382/260 |
| 2014/0205202 A1 * | 7/2014 | Toda ............................. | 382/275 |

FOREIGN PATENT DOCUMENTS

| | | |
|---|---|---|
| JP | 02-058181 | 2/1990 |
| JP | 2002-010108 | 1/2002 |
| JP | 2002-057900 | 2/2002 |

OTHER PUBLICATIONS

International Search Report mailed Nov. 20, 2012.

* cited by examiner

*Primary Examiner* — Amir Alavi
(74) *Attorney, Agent, or Firm* — Finnegan, Henderson, Farabow, Garrett & Dunner LLP

(57) ABSTRACT

The present invention is directed to a noise reduction method, comprising: for each of multi-layer regions each containing a pixel of interest and having a successively reducing area, calculating a pixel statistic value of pixels in that region; for each of successive layers, correcting the pixel statistic value for a region at a current layer using a corrected pixel statistic value for a region at a preceding layer having a greater area than that of the region at the current layer; and correcting the pixel of interest using a corrected pixel statistic value for a region with a smallest area.

20 Claims, 11 Drawing Sheets

NOISE REDUCTION APPARATUS, NOISE REDUCTION METHOD, AND COMPUTER-READABLE STORAGE MEDIUM

CROSS-REFERENCE TO RELATED PATENT APPLICATIONS

This application is a National Stage Entry of International Application No. PCT/JP2012/071072, filed Aug. 21, 2012, which claims priority from Japanese Patent Application No. 2011-180637, filed Aug. 22, 2011. The entire contents of the above-referenced applications are expressly incorporated herein by reference.

TECHNICAL FIELD

The present invention relates to a noise reduction apparatus, a noise reduction method, and a program.

BACKGROUND ART

Among image processing technologies, a technology for reducing a random noise contained in an image is indispensable to reproduce a captured image more clearly. The technologies for reducing a random noise include one disclosed in PTL 1, for example.

The technology described in PTL 1 is comprised of, for an arbitrary pixel of interest 'i' in a color digital signal in a primary scan direction output from an input image processing circuit, a plurality of calculation circuits for calculating a number of moving average pixels 'n' based on a predetermined equation; a plurality of bit selection circuits for selectively outputting the pixel of interest 'i' and 'n' reference pixels 'j' preceding and following the pixel of interest 'i'; a plurality of differentiation circuits for calculating an absolute value of a difference between an output level of the pixel of interest 'i' and an output level of each reference pixel 'j'; a plurality of decision circuits for outputting the pixel of interest 'i', comparing a value output from the plurality of differentiation circuits with a predetermined threshold in a threshold storage memory, and outputting the reference pixel 'j' based on a result of said comparison; and a plurality of calculation circuits for performing moving average processing on output signals from the plurality of decision circuits.

In other words, since it is configured to add a reference pixel 'j' to moving average processing only when the absolute value of the difference between the output level of the pixel of interest 'i' and the output level of the reference pixel 'j' is equal to or smaller than a threshold, a portion in which the absolute value of the difference changes sharply beyond the threshold is excluded from the moving average processing, and noise components can be thereby effectively removed.

CITATION LIST

Patent Literature

PTL 1: JP-P2002-57900A

SUMMARY OF INVENTION

Technical Problem

The technology of PTL 1, however, cannot remove a low-frequency noise having periodicity equal to or greater than the size of a smoothing filter.

Thus, the present invention has been made in view of the problem, and its object is to provide a noise reduction apparatus, a noise reduction method, and a program capable of effectively removing a noise.

Disclosure of the Invention

The present invention is a noise reduction method comprising: for each of multi-layer regions each containing a pixel of interest and having a successively reducing area, calculating a pixel statistic value of pixels in that region; and for each of successive layers, correcting the pixel statistic value for a region at a current layer using a corrected pixel statistic value for a region at a preceding layer having a greater area than that of the region at the current layer; and correcting said pixel of interest using a corrected pixel statistic value for a region with a smallest area.

The present invention is a noise reduction apparatus comprising: pixel statistic value calculating means for, for each of multi-layer regions each containing a pixel of interest and having a successively reducing area, calculating a pixel statistic value of pixels in that region; and correcting means for, for each of successive layers, correcting the pixel statistic value for a region at a current layer using a corrected pixel statistic value for a region at a preceding layer having a greater area than that of the region at the current layer, and correcting said pixel of interest using a corrected pixel statistic value for a region with a smallest area.

The present invention is a program for causing a computer to execute the processing of: for each of multi-layer regions each containing a pixel of interest and having a successively reducing area, calculating a pixel statistic value of pixels in that region; for each of successive layers, correcting the pixel statistic value for a region at a current layer using a corrected pixel statistic value for a region at a preceding layer having a greater area than that of the region at the current layer; and correcting said pixel of interest using a corrected pixel statistic value for a region with a smallest area.

Advantageous Effects of Invention

According to the present invention, a noise can be effectively removed.

DESCRIPTION OF EMBODIMENTS

First Embodiment

A first embodiment of the present invention will now be described.

Figure 1:
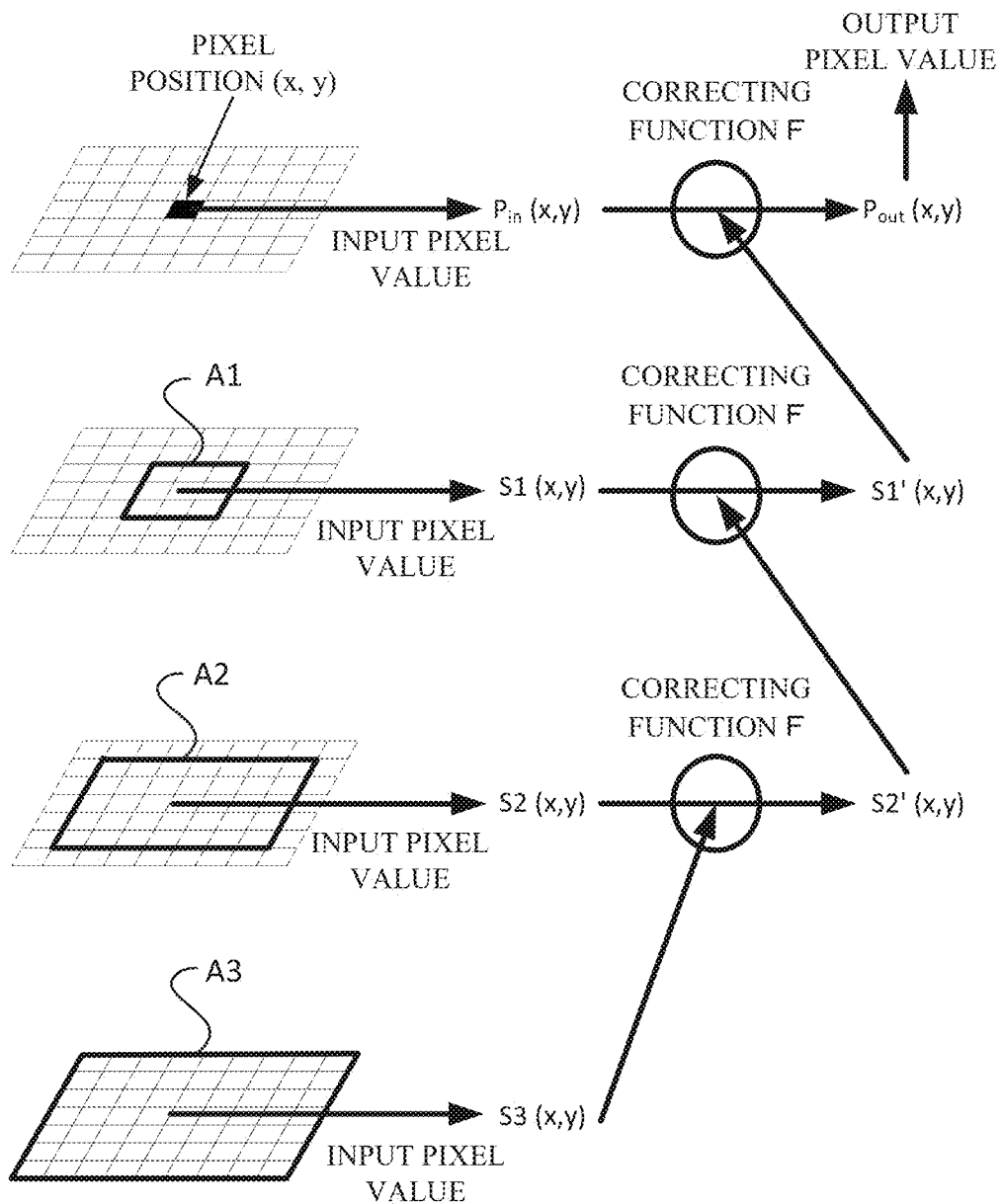
FIG. 1 is a diagram for explaining the processing in a first embodiment.

FIG. 1 is a diagram for explaining the processing in the first embodiment of the present invention.

The first embodiment of the present invention is characterized in comprising: for each of multi-layer regions each containing a pixel of interest and having a successively reducing area, calculating a pixel statistic value of pixels in that region; and for each of successive layers, correcting the pixel statistic value for a region at a current layer using a corrected pixel statistic value for a region at a preceding layer having a greater area than that of the region at the current layer; and correcting said pixel of interest using a corrected pixel statistic value for a region with a smallest area.

As used herein, the pixel statistic value of pixels refers to, for example, a spatial average value in a region at each layer, including the arithmetic mean value, geometric mean value, or weighted average value of pixels lying in that region. The following description of the embodiment addresses a case in which the pixel statistic value is a spatial average value, and the spatial average value is the arithmetic mean value of pixels lying in a region.

While in the configuration in FIG. 1, a processing flow for performing multiple resolution processing at three layers (A1 through A3) is illustrated, it can be easily extended to the processing with a number of layers other than three.

In the first embodiment, based on a spatial average value S3(x,y) for a large region A3 (a range: −k3 through k3) centering at a pixel position (x, y) (a pixel of interest), a spatial average value (S2(x,y)) for a middle region A2 (a range: −k2 through k2) is corrected. Then, based on the corrected spatial average value (S2'(x, y)) for the middle region A2, a spatial average value (S1(x,y)) for a small region A1 (a range: −k1 through k1) is corrected. By thus successively processing the correction, a pixel-of-interest value Pin(x, y) is corrected and an output pixel value Pout(x, y) is obtained.

While the following description addresses a case in which the spatial average value (S2(x, y)) is corrected to calculate the spatial average value (S2'(x, y)), the same applies to correction of (S1(x,y)) and $P_{in}(x, y)$.

First, a spatial average value S3(x,y) for a large region (a range: −k3 through k3) and a spatial average value S2(x,y) for a middle region (a range: −k2 through k2) at a pixel position (x, y) are calculated as given by EQS. (1) and (2):

$$S3(x, y) = \frac{1}{(2 \cdot k3 + 1)^2} \sum_{i=-k3}^{k3} \sum_{j=-k3}^{k3} P_{in}(x+i, y+j) \quad (1)$$

$$S2(x, y) = \frac{1}{(2 \cdot k2 + 1)^2} \sum_{i=-k2}^{k2} \sum_{j=-k2}^{k2} P_{in}(x+i, y+j) \quad (2)$$

Next, an equation for obtaining S2'(x, y) is expressed as follows:

$$S2'(x,y)=S3(x,y)+\text{Func}(S2(x,y)-S3(x,y)) \quad (3)$$

Figure 2:
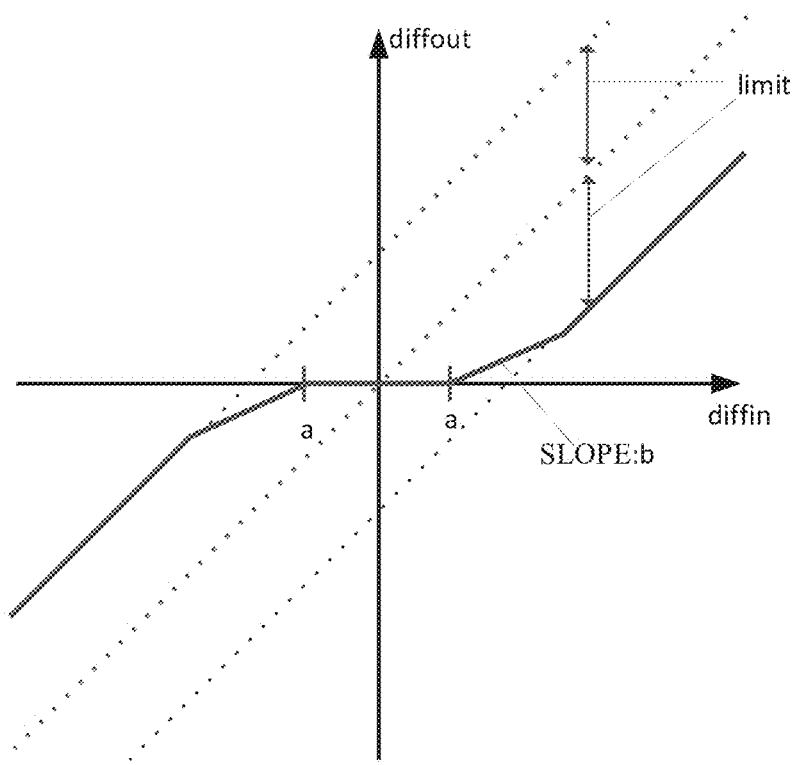
FIG. 2 is a diagram showing an example of a function Func.

In the equation, Func( ) denotes a correcting function for suppressing noise components, and corresponds to the correcting function F in FIG. 1. Func( ) may be any function having such a property as to generate an output value coming closer to zero for an input value for the function closer to zero, and an output value coming closer to the input value for a greater absolute value of the input value. An example of the function Func having such a property is shown in FIG. 2. The parameters of the correcting function in FIG. 2, 'a,' 'b,' and 'limit,' are for controlling the degree of suppression of noise components, and are determined depending upon the noise property of an image sensor, for example, wherein respective values of the parameters may be determined based on an evaluation experiment for subjectively evaluating image quality of an image actually captured by the sensor.

Similar processing is applied to equations for deriving S1'(x, y) and $P_{out}(x, y)$ by merely modifying the spatial average values to be substituted into EQ. (3).

Next, a noise reduction apparatus in the first embodiment will be described.

Figure 3:
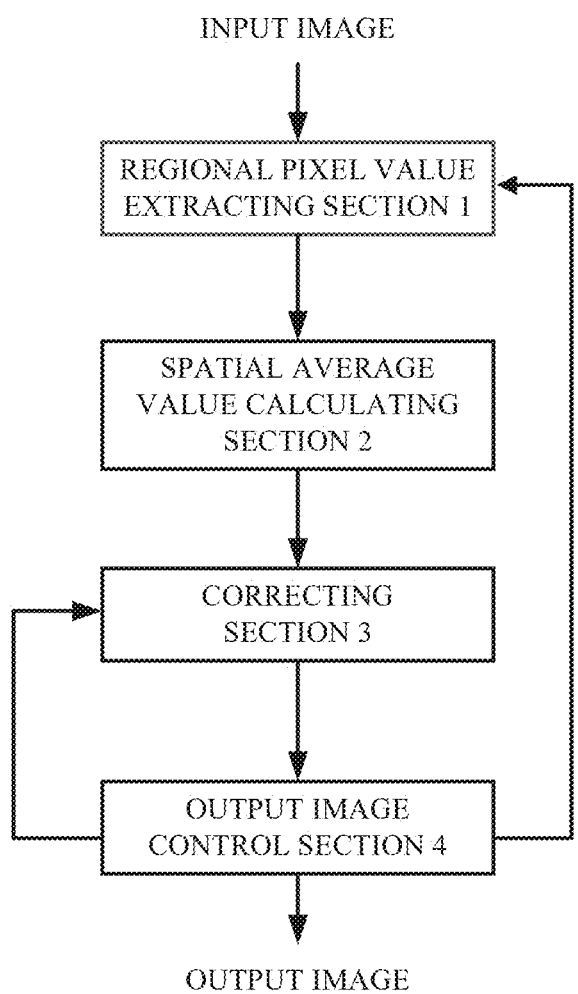
FIG. 3 is a block diagram of a noise reduction apparatus in the first embodiment.

FIG. 3 is a block diagram of the noise reduction apparatus in the first embodiment.

The noise reduction apparatus in the first embodiment comprises a regional pixel value extracting section 1, a spatial average value calculating section 2, a correcting section 3, and an output image control section 4.

The regional pixel value extracting section 1, which is under the control of the output image control section 4, extracts pixel values of pixels lying in a large region A3 (a range: −k3 through k3) centering at a pixel position (x, y) (a pixel of interest), pixel values of pixels lying in a middle region A2 (a range: −k2 through k2), pixel values of pixels lying in a small region A1 (a range: −k1 through k1), and a pixel value of an input pixel value Pin(x, y) at respective appropriate times, and outputs them to the spatial average value calculating section 2.

The spatial average value calculating section 2 receives the pixel values for each region from the regional pixel value extracting section 1, and calculates a spatial average value for that region. Then, the calculated spatial average value is output to the correcting section 3.

The correcting section 3 receives, as input, the corrected spatial average value in a region at a preceding layer from the output image control section 4, and the spatial average value in the region at the current layer from the spatial average value calculating section 2, and corrects the spatial average value at the current layer. The method of correction performs correction using the aforementioned correcting function.

The output image control section 4 outputs a command to the regional pixel value extracting section 1 to extract pixel values of pixels in a region at a next layer each time the corrected spatial average value is successively input thereto. It also feeds the corrected spatial average value back to the correcting section 3 each time the value is input thereto. When Pout(x, y) for one pixel is input, it outputs Pout(x, y) as an output pixel value.

According to the first embodiment, by successively correcting the pixel statistic value from that in a region of a larger area to that in a region of a smaller area, noise reduction can be effectively achieved not only for a high-frequency noise but also for a low-frequency noise.

Second Embodiment

A second embodiment of the present invention will be described.

Figure 4:
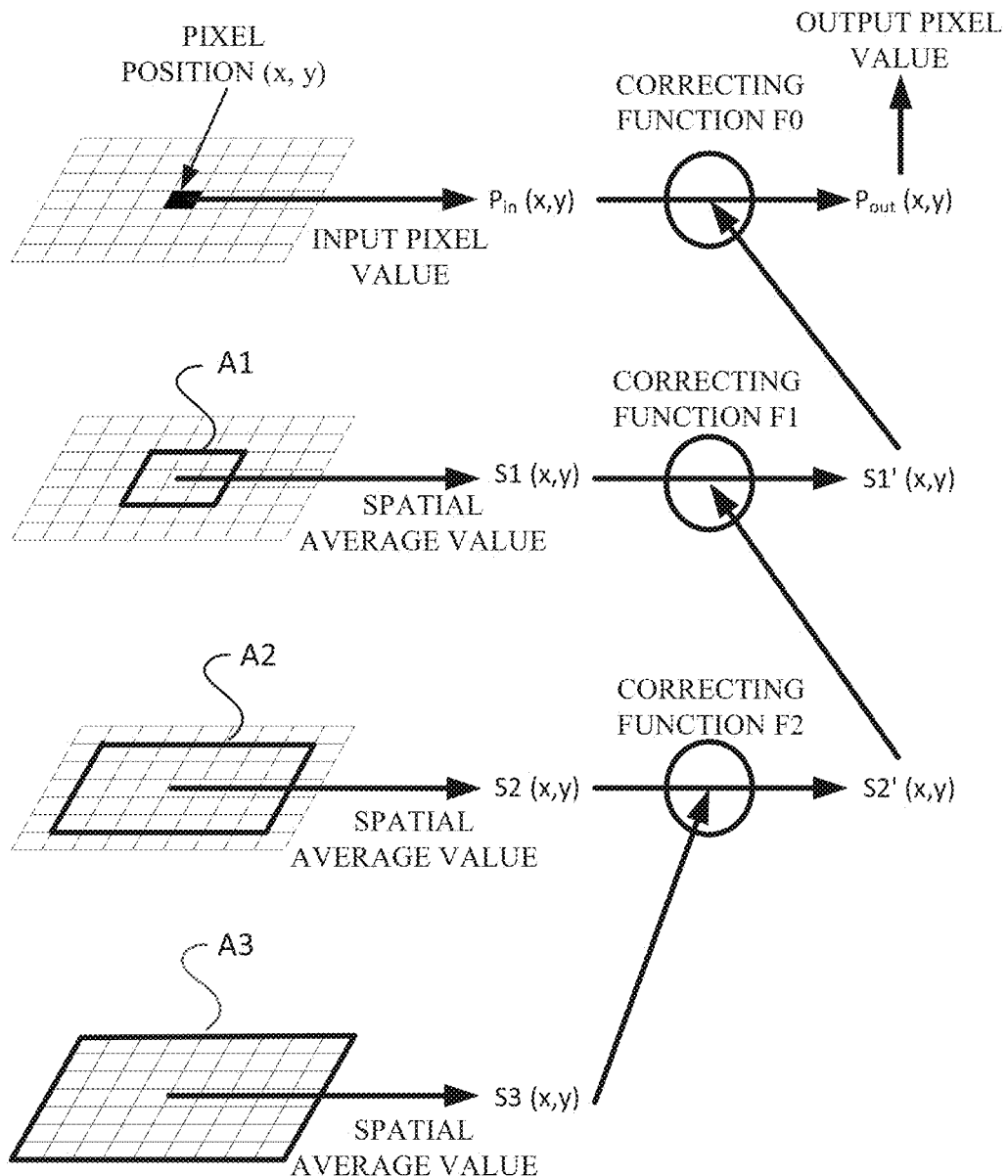
FIG. 4 is a diagram for explaining the processing in a second embodiment.

FIG. 4 is a diagram for explaining the processing in the second embodiment of the present invention.

The second embodiment comprises modifying the function Func for suppressing noise components in the first embodiment on a layer-by-layer basis. That is, a correcting function F for each layer is different on a layer-by-layer basis, as shown in FIG. 4.

For example, the parameter 'a' of the function Func (a correcting function) in FIG. 2 is modified according to the amount of change in the pixel value introduced by a noise. Specifically, a function F2 is determined with the parameter 'a' set to a1 according to the amount of change in the pixel value introduced by a low-frequency noise appearing in a space in a large region (for example, an area A3 in FIG. 4). Moreover, a function F1 is determined with the parameter 'a' set to a2 according to the amount of change in the pixel value introduced by a mid-frequency noise appearing in a space in a middle region (for example, an area A2 in FIG. 4). Here, a relationship a2>a1 is often kept, although this does not necessarily hold.

Likewise, a function F0 is determined with the parameter 'a' set to a3 according to the amount of change in the pixel value introduced by a high-frequency noise appearing in a space in a small region (for example, an area A1 in FIG. 4). Here, a relationship a3>a2>a1 is often kept, although this does not necessarily hold.

By doing so, a difference in property of a noise appearing in a space at each layer can be adaptively accommodated.

Next, a noise reduction apparatus in the second embodiment will be described.

Figure 5:
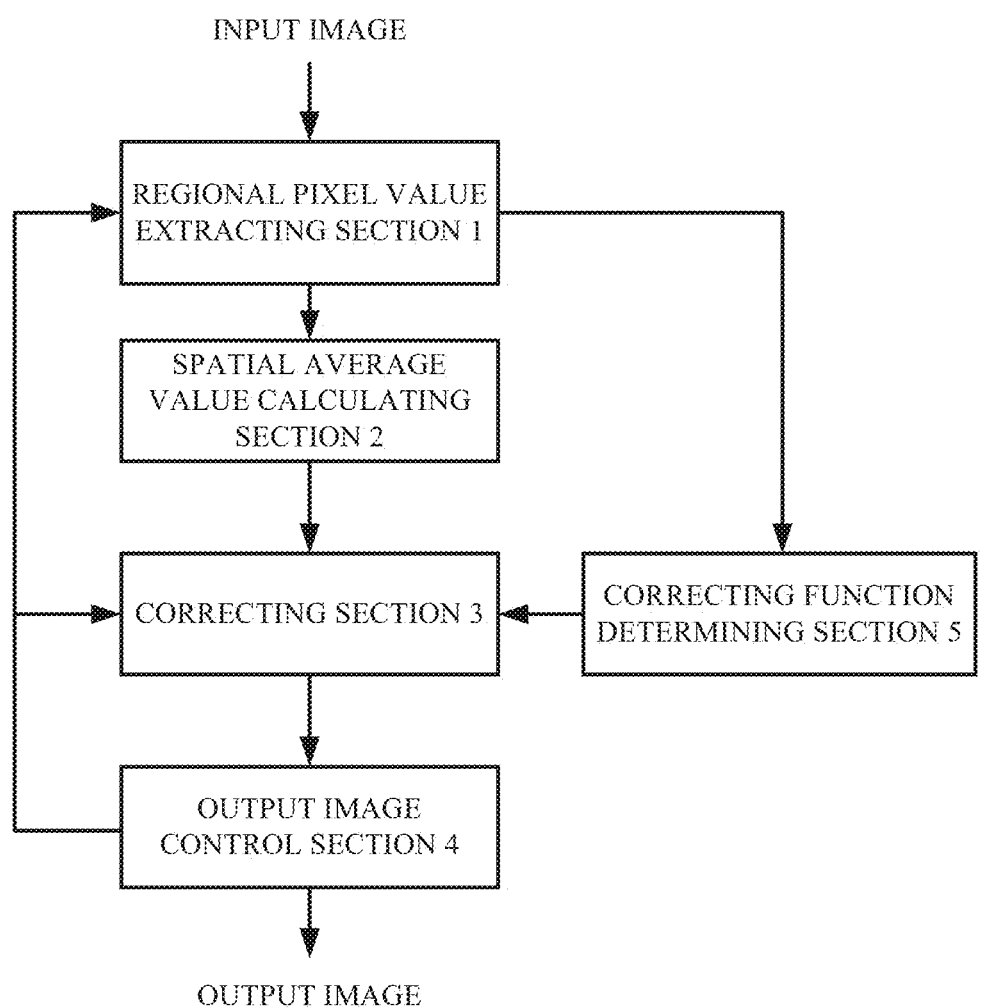
FIG. 5 is a block diagram of a noise reduction apparatus in the second embodiment.

FIG. 5 is a block diagram of the noise reduction apparatus in the second embodiment.

The noise reduction apparatus in the second embodiment comprises a regional pixel value extracting section 1, a spatial average value calculating section 2, a correcting section 3, an output image control section 4, and a correcting function determining section 5.

The noise reduction apparatus in the second embodiment is different from the noise reduction apparatus in the first embodiment in that it comprises the correcting function determining section 5. The correcting function determining section 5 receives the pixel values of pixels in each region from the regional pixel value extracting section 1, and as described earlier, determines the parameter 'a' of the function Func (a correcting function) according to the amount of change in the pixel value introduced by a noise appearing in a space in that region.

The correcting section 3 corrects the spatial average value at each layer according to the function Func (a correcting function) determined by the correcting function determining section 5.

Other components are similar, description of which will be omitted.

Since the second embodiment modifies the function Func for suppressing noise components on a layer-by-layer basis, a noise can be removed more effectively.

Third Embodiment

A third embodiment of the present invention will be described.

Although the embodiments described above achieve a sufficient effect in removal of a noise, unsharpening of edges may occur in some images. Thus, in the third embodiment, a noise reduction method and a noise reduction apparatus will be described that are capable of removing a low-frequency noise and a high-frequency noise, and also suppressing unsharpening of edges.

Figure 6:
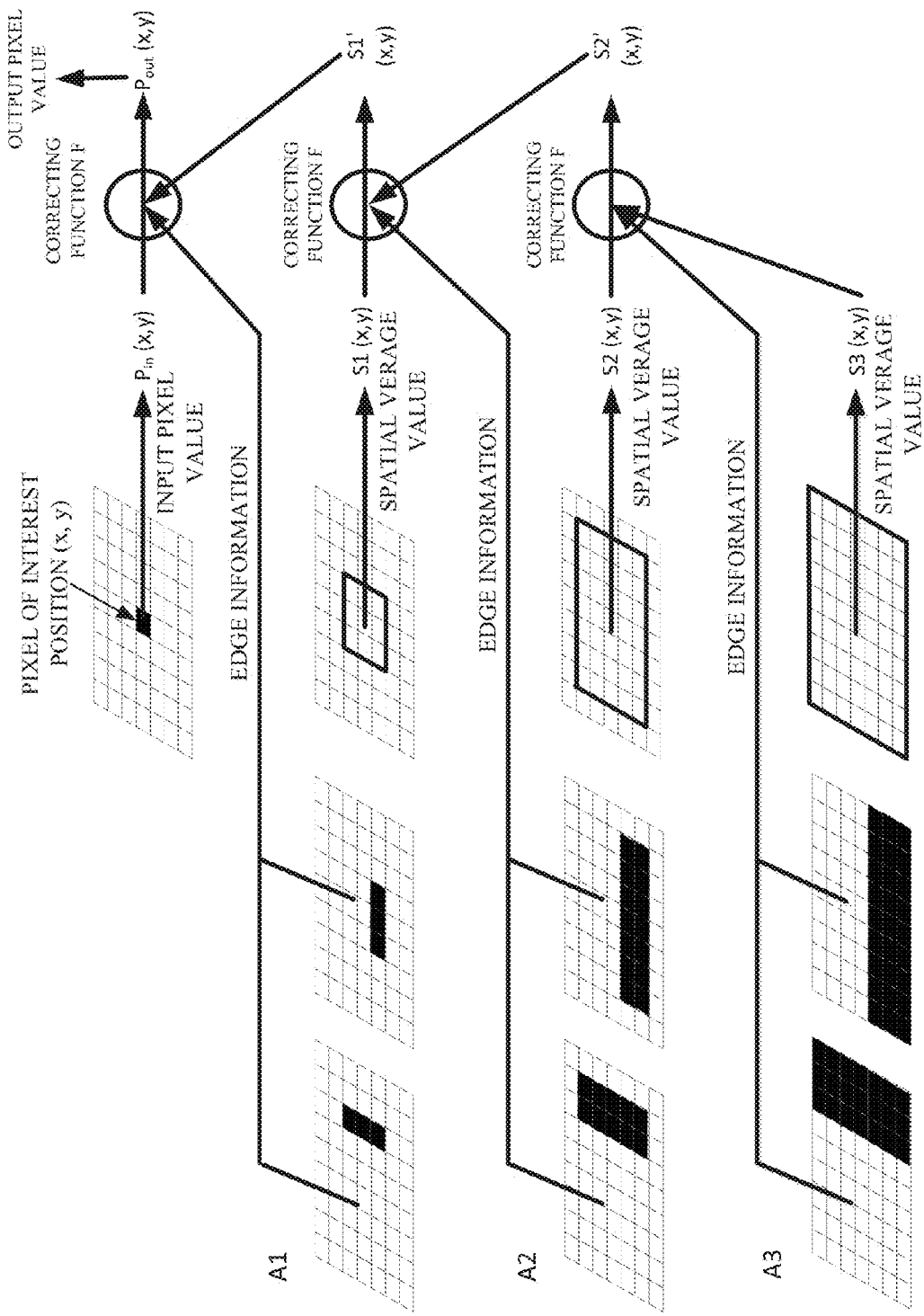
FIG. 6 is a diagram for explaining the processing in a third embodiment.

FIG. 6 is a diagram for explaining the processing in the third embodiment of the present invention.

While in the configuration in FIG. 6, a processing flow for performing multiple resolution processing at three layers is illustrated, it can be easily extended to the processing with a number of layers other than three. Moreover, the pixel statistic value of pixels refers to, for example, a spatial average value in a region at each layer, including the arithmetic mean value, geometric mean value, or weighted average value of pixels lying in that region. The following description of the embodiment addresses a case in which the pixel statistic value is a spatial average value, and the spatial average value is the arithmetic mean value of pixels lying in a region.

The third embodiment is characterized in the following process: The spatial average value (S2(x,y)) in a middle region is corrected based on the spatial average value S3(x,y), which is the pixel statistic value in a space in a large region, and on edge information for that region, or the amount of an edge E3(x, y). Then, the spatial average value (S1(x,y)) is corrected in a small region based on the corrected spatial average value (S2'(x, y)) in the middle region and on the amount of an edge (E2(x, y)) in the middle region. By thus successively processing the correction, an input pixel value Pin(x, y) is corrected and an output pixel value Pout(x, y) is obtained.

As used herein, edge information or the amount of an edge is defined by the differential value of the statistic amount (an average value, median, or the like) of pixels in vertically and horizontally adjacent regions centering at a pixel of interest (an input pixel).

Next, details of the processing will be described.

The flows of the processing at several layers are similar except that the parameters for determining the amount of correction are different. Thus, as an example, details of the processing for correcting the spatial average value S2(x,y) in a middle region using the spatial average value S3(x,y) in a large region will be described.

First, in the third embodiment, the spatial average value S3(x,y) in a large region (a range: −k3 through k3) and the spatial average value S2(x,y) in a middle region (a range: −k2 through k2) at a pixel position (x, y) are calculated as given by EQS. (1) and (2):

$$S3(x, y) = \frac{1}{(2 \cdot k3 + 1)^2} \sum_{i=-k3}^{k3} \sum_{j=-k3}^{k3} P_{in}(x+i, y+j) \quad (1)$$

$$S2(x, y) = \frac{1}{(2 \cdot k2 + 1)^2} \sum_{i=-k2}^{k2} \sum_{j=-k2}^{k2} P_{in}(x+i, y+j) \quad (2)$$

Next, the amount of an edge E3(x, y) in the large region is calculated. In calculating the amount of an edge, first, the amount of a vertical edge EV3(x, y) and the amount of a horizontal edge EH3(x, y) are calculated as given by EQS. (4) and (5), and the results are added as given by EQ. (6) to calculate the amount of an edge E3(x, y) in the large region.

$$EV3(x, y) = \frac{1}{(2 \cdot k3 + 1) \cdot k3} \left| \sum_{i=-k3}^{k3} \sum_{j=1}^{k3} (P_{in}(x+i, y+j) - P_{in}(x+i, y-j)) \right| \quad (4)$$

$$EH3(x, y) = \frac{1}{(2 \cdot k3 + 1) \cdot k3} \left| \sum_{i=1}^{k3} \sum_{j=-k3}^{k3} (P_{in}(x+i, y+j) - P_{in}(x-i, y+j)) \right| \quad (5)$$

$$E3(x, y) = EV3(x, y) + EH3(x, y) \quad (6)$$

Subsequently, a combined weight α3(x, y) calculated from the calculated amount of an edge E3(x, y) is used to correct the spatial average value S3(x,y) in the large region as given by EQ. (7), and a corrected spatial average value S3"(x, y) in the large region is calculated. The combined weight α3(x, y) is calculated using predefined thresholds hi and lo, as given by EQ. (8). It should be noted that the thresholds hi and lo are thresholds determined on a layer-by-layer basis, and although they are set to respective optimal values on a layer-by-layer basis, they may be the same.

$$S3''(x, y) = (1 - \alpha3(x, y)) \cdot S3(x, y) + \alpha3(x, y) \cdot S2(x, y) \quad (7)$$

$$\alpha3(x, y) = \begin{cases} 1.0 & \text{if } E3(x, y) > hi \\ 0.0 & \text{else if } E3(x, y) < lo \\ \frac{E3(x, y) - lo}{hi - lo} & \text{else} \end{cases} \quad (8)$$

Finally, the calculated spatial average value S3" is used to correct the spatial average value S2(x,y) in the middle region as given by EQ. (9):

$$S2'(x,y) = S3''(x,y) + \text{Func}(S2(x,y) - S3''(x,y)) \quad (9)$$

For the correcting function Func, the function shown in FIG. 2 is employed. For example, correction of the spatial average value S2(x, y) in the middle region at a pixel position (x, y) is achieved by setting diffin as (S2(x, y)−S3"(x, y)), and adding the amount of correction diffout resulting from the correcting function in FIG. 2 to S2(x,y). The parameters in the correcting function in FIG. 2, 'a' 'b,' and 'limit', are determined for each resolution to be processed and each color component to be corrected.

A difference of the third embodiment from the first and second embodiments is that the spatial average value in the large region is corrected by the correcting function of EQ. (7) based on edge information. In the third embodiment, by setting the combined weight to 1.0 for a greater amount of an edge, the spatial average value in a large region is replaced with the spatial average value in a small region. Accordingly, for a greater amount of an edge, correction by EQ. (9) results in S2'(x, y)=S2(x, y), which means that no correction is actually applied.

Thus, in the third embodiment, the amount of substantial correction is controlled based on edge information, and by using the method, unsharpening of edges can be suppressed.

Next, the noise reduction apparatus in the third embodiment will be described.

Figure 7:
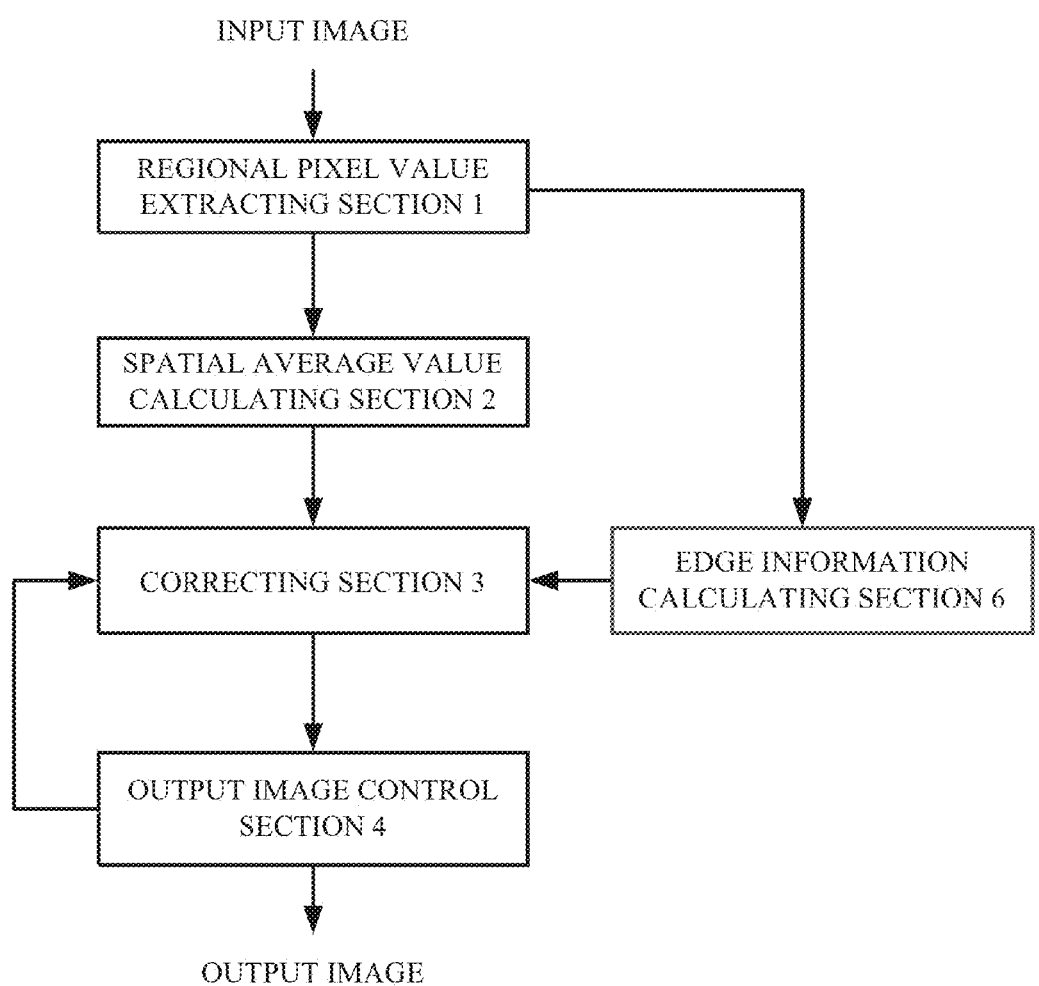
FIG. 7 is a block diagram of a noise reduction apparatus in the third embodiment.

FIG. 7 is a block diagram of the noise reduction apparatus in the third embodiment.

The noise reduction apparatus in the third embodiment comprises a regional pixel value extracting section 1, a spatial average value calculating section 2, a correcting section 3, an output image control section 4, and an edge information calculating section 6.

The regional pixel value extracting section 1, which is under the control of the output image control section 4, extracts pixel values of pixels lying in a large region A3 (a range: −k3 through k3) centering at a pixel position (x, y) (a pixel of interest), pixel values of pixels lying in a middle region A2 (a range: −k2 through k2), pixel values of pixels lying in a small region A1 (a range: −k1 through k1), and a pixel value of an input pixel value Pin(x, y) (a pixel of interest) at respective appropriate times, and outputs them to the spatial average value calculating section 2.

The spatial average value calculating section 2 receives the pixel values for each region from the regional pixel value extracting section 1, and calculates a spatial average value for that region. Then, the calculated spatial average value is output to the correcting section 3.

The edge information calculating section 6 calculates the amount of an edge E3(x, y) in the large region A3 based on the pixel values of pixels lying in the large region from the regional pixel value extracting section 1. In calculating the amount of an edge, the amount of a vertical edge EV3(x, y) and the amount of a horizontal edge EH3(x, y) are calculated as given by EQS. (4) and (5), and the results are added as given by EQ. (6) to calculate the amount of an edge E3(x, y) in the large region A3. Likewise, the amount of an edge E2(x, y) in the middle region A2 and the amount of an edge E1(x, y) in the small region A1 are calculated.

The correcting section 3 uses a combined weight α3(x, y) obtained from the calculated amount of an edge E3(x, y) by the edge information calculating section 6 to correct the spatial average value S3(x, y) in the large region as given by EQ. (7), and a corrected spatial average value S3"(x, y) in the large region is calculated. It should be noted that the combined weight α3(x, y) is calculated using predefined thresholds hi and lo as given by EQ. (8).

Moreover, the calculated spatial average value S3" is used to correct the spatial average value S2(x,y) in the middle region as given by EQ. (9). Similar correction is applied to the spatial average value S1(x,y) and input pixel value Pin(x, y).

The output image control section 4 issues a command to the regional pixel value extracting section 1 to extract pixel values of pixels in a region at a next layer each time the corrected spatial average value is successively input thereto. It also feeds the corrected spatial average value back to the correcting section 3 each time the value is input thereto. When Pout(x, y) for one pixel is input, it outputs Pout(x, y) as an output pixel value.

The third embodiment can suppress unsharpening of edges more, in addition to the effects in the first and second embodiments.

Fourth Embodiment

Now a fourth embodiment will be described.

Figure 8:
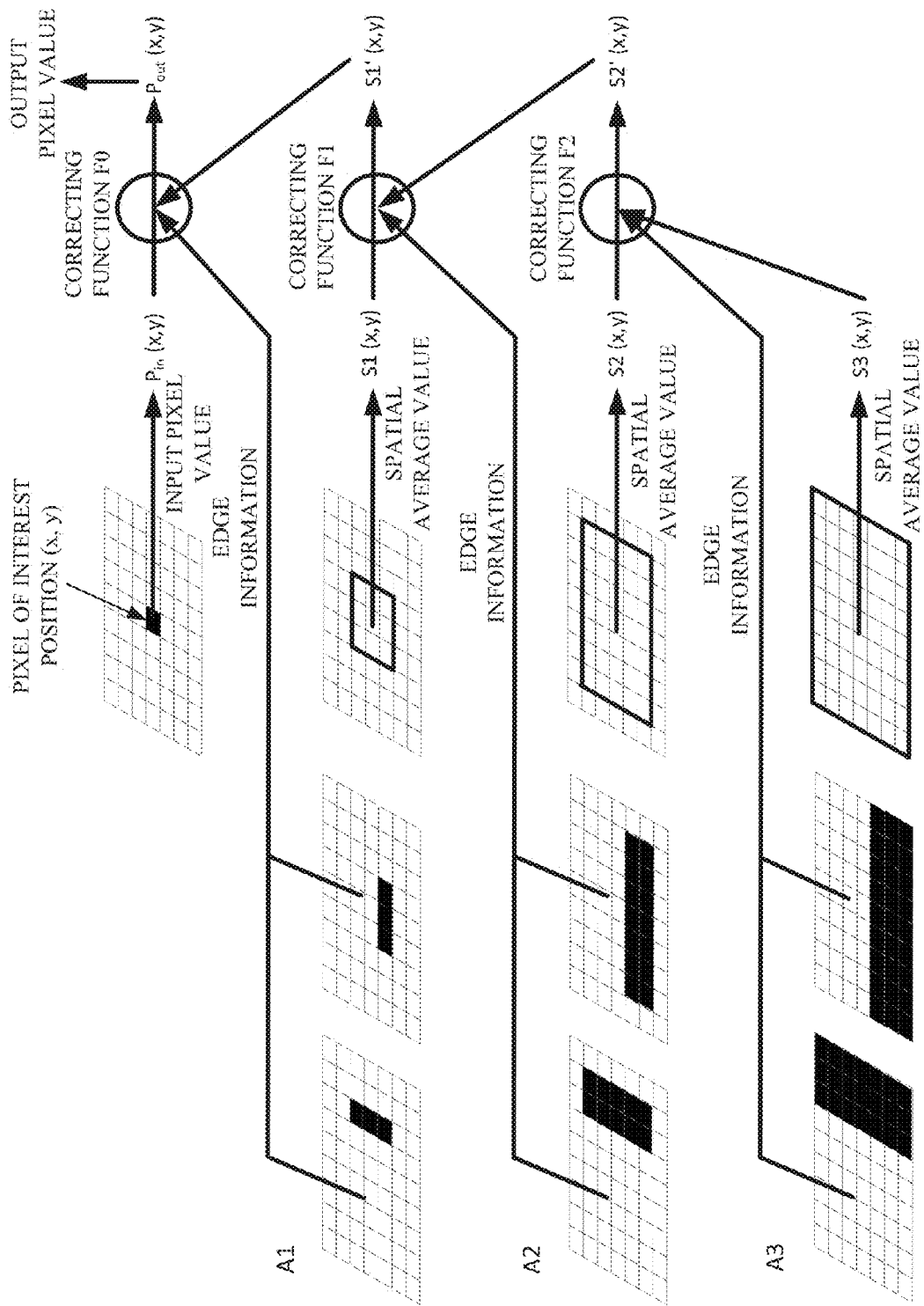
FIG. 8 is a diagram for explaining the processing in a fourth embodiment.

FIG. 8 is a diagram for explaining the processing in the fourth embodiment of the present invention.

The fourth embodiment is characterized in that, as shown in FIG. 8, the amount of an edge E3(x, y) calculated by EQ. (6) at each layer is reflected on a function Func (a correcting function) for suppressing noise components, and noise components at each layer are adaptively suppressed by modifying the function Func (a correcting function) at each layer.

First, a method of determining a parameter 'a' in the function Func for suppressing a low-frequency noise appearing in a space in a large region in the fourth embodiment will be described.

As given by EQ. (10), the function Func is applied to a difference between the spatial average value S3(x, y) in a large region and the spatial average value S2(x, y) in a middle region, and a result thereof added to the spatial average value S3(x, y) is output as a corrected value S2'(x, y) of the spatial average value S2(x, y) in the middle region.

$$S2'(x,y)=S3(x,y)+\text{Func}(S2(x,y)-S3(x,y)) \quad (10)$$

In the equation, the parameter 'a' for the function Func is determined using the amount of an edge E3(x, y) in the large region A2 calculated according to EQ. (6).

Now a factor β3(x, y) having a value varying according to the amount of an edge E3(x, y) is defined as given by EQ. (11). The thresholds hi and lo for E3(x, y) have predefined values. It should be noted that the thresholds hi and lo are thresholds determined on a layer-by-layer basis, and although they are set to respective optimal values on a layer-by-layer basis, they may be the same.

$$\beta 3(x, y) = \begin{cases} 1.0 & \text{if } E3(x, y) > hi \\ 0.0 & \text{else if } E3(x, y) < lo \\ \dfrac{E3(x, y) - lo}{hi - lo} & \text{else} \end{cases} \quad (11)$$

The factor β3(x, y) defined by EQ. (11) is a real number from 0 to 1.0. The factor β3(x, y) is used to set the parameter 'a' in the function Func.

Figure 9:
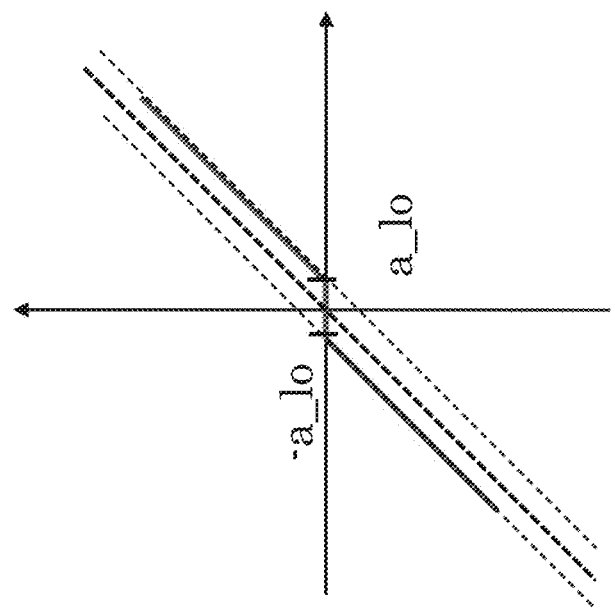
FIG. 9 is a diagram showing an example of setting of a parameter 'a' in a space in a large region.
Figure 9:
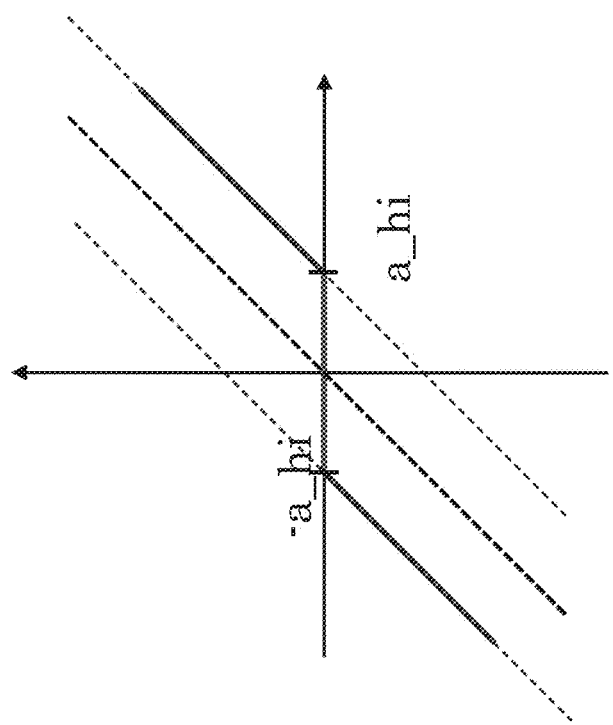

An example of setting of the parameter 'a' in a space in a large region shown in FIG. 9 will be described hereinbelow.

Here, the parameter 'a' is expressed by the following equation:

$$a=\beta 3(x,y)\cdot a\_lo+(1-\beta 3(x,y))\cdot a\_hi \quad (12)$$

In the equation, a_lo is a value used as the parameter 'a' when the amount of an edge E3(x, y) is smaller than the threshold lo, and a_hi is a value used as the parameter 'a' when the amount of an edge is greater than the threshold hi. The parameter 'a' takes a value from a_lo to a_hi for an amount of an edge E3(x, y) ranging from the threshold lo to hi, wherein a_lo is a real number equal to or greater than zero, and a_hi is a real number such that a_hi>=a_lo.

Subsequently, the parameter 'a' in the function Func is similarly set for the middle region A2 and small region A1.

Figure 10:
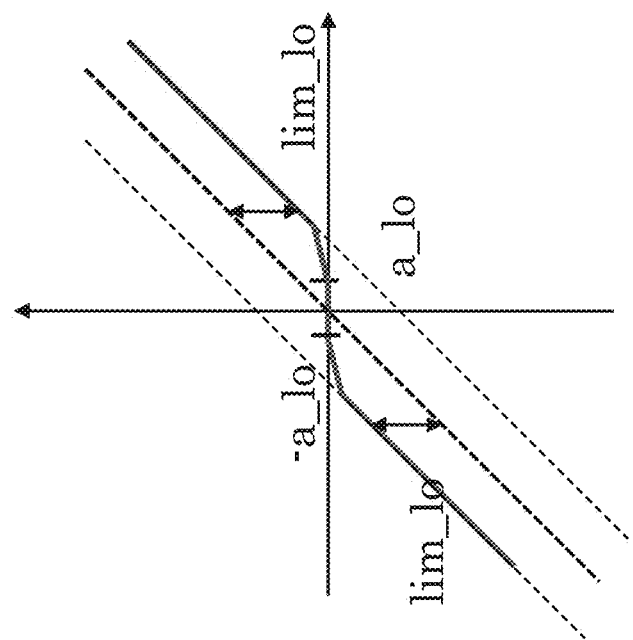
FIG. 10 is a diagram for explaining an example of setting of a parameter 'limit' in a space in a large region.
Figure 10:
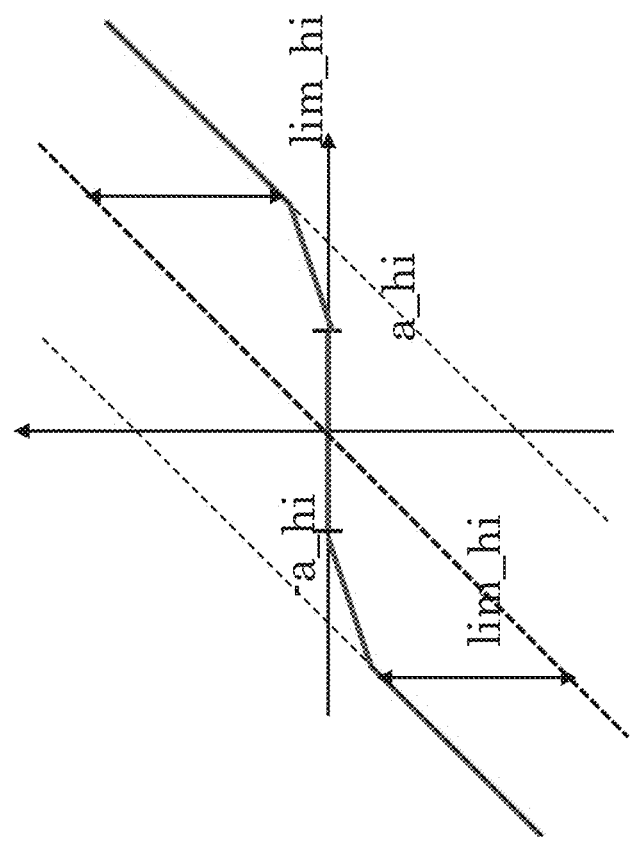

It should be noted that a method of reflecting the amount of an edge on the parameter 'limit' in the function Func may be contemplated. The factor β3(x, y) in EQ. (11) is used to set the parameter 'limit' in the function Func. An example of setting of the parameter 'limit' in a space in a large region shown in FIG. 10 will be described hereinbelow. The parameter 'limit' can be expressed by the following equation:

$$\text{limit}=\beta 3(x,y)\cdot\text{lim\_lo}+(1-\beta 3(x,y))\cdot\text{lim\_hi} \quad (13)$$

In the equation, lim_lo is a value used as the parameter 'limit' when the amount of an edge E3(x, y) is smaller than the threshold lo, and lim_hi is a value used as the parameter 'limit' when the amount of an edge is greater than the threshold hi. The parameter 'limit' takes a value from lim_lo to lim_hi for an amount of an edge E3(x, y) ranging from the threshold lo to hi. It should be noted that lim_lo is a real number equal to or greater than zero, and lim_hi is a real number such that lim_hi>=lim_lo.

The parameter 'limit' in the function Func is similarly defined for the middle and small regions.

Next, the noise reduction apparatus in the fourth embodiment will be described.

Figure 11:
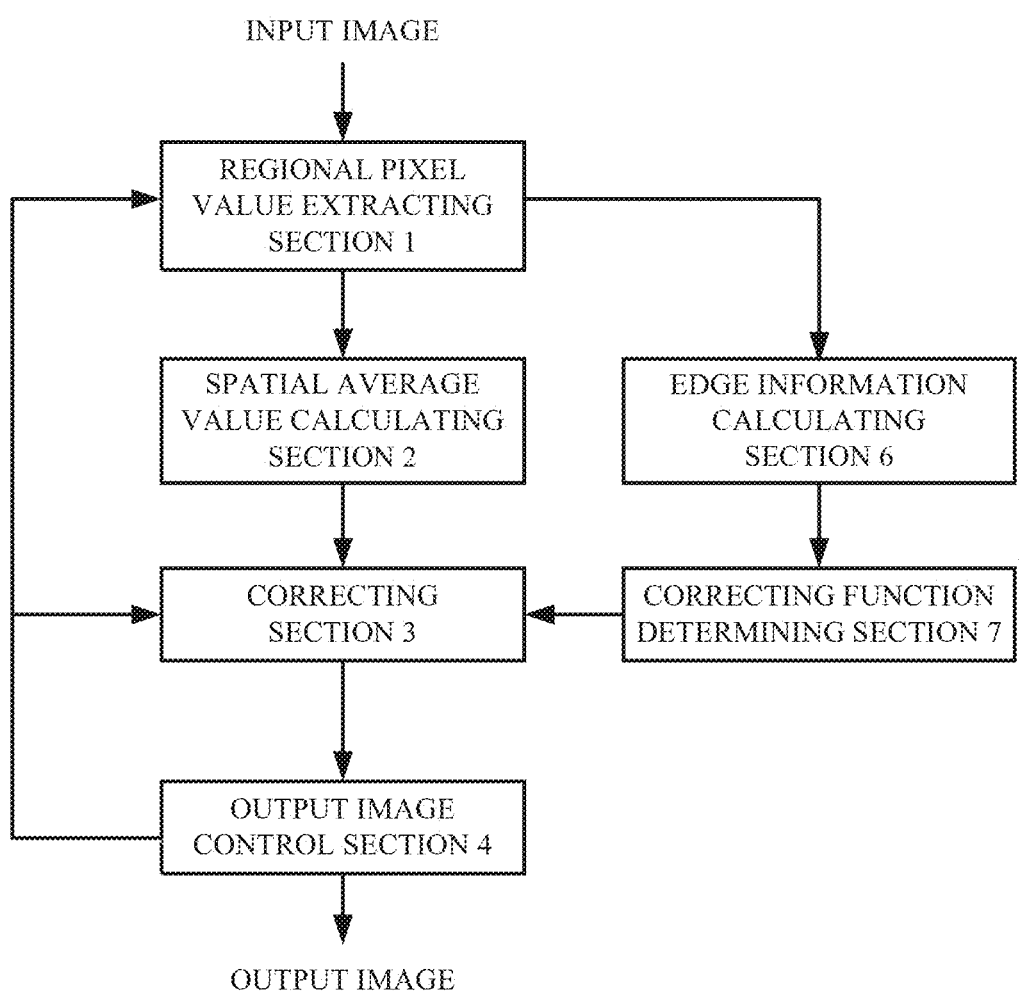
FIG. 11 is a block diagram of a noise reduction apparatus in the fourth embodiment.

FIG. 11 is a block diagram of the noise reduction apparatus in the fourth embodiment.

The noise reduction apparatus in the fourth embodiment comprises a regional pixel value extracting section 1, a spatial average value calculating section 2, a correcting section 3, an output image control section 4, an edge information calculating section 6, and a correcting function determining section 7.

The regional pixel value extracting section 1, which is under the control of the output image control section 4, extracts pixel values of pixels lying in a large region A3 (a range: −k3 through k3) centering at a pixel position (x, y), pixel values of pixels lying in a middle region A2 (a range: −k2 through k2), pixel values of pixels lying in a small region A1 (a range: −k1 through k1), and a pixel value of an input pixel value Pin(x, y) at respective appropriate times, and outputs them to the spatial average value calculating section 2.

The spatial average value calculating section 2 receives the pixel values for each region from the regional pixel value extracting section 1, and calculates a spatial average value for that region. Then, the calculated spatial average value is output to the correcting section 3.

The edge information calculating section 6 first calculates the amount of an edge E3(x, y) in the large region A3 based on the pixel values of pixels lying in the large region from the regional pixel value extracting section 1. In calculating the amount of an edge, the amount of a vertical edge EV3(x, y) and the amount of a horizontal edge EH3(x, y) are calculated as given by EQS. (4) and (5), and the results are added as given by EQ. (6) to calculate the amount of an edge E3(x, y) in the large region A3. Likewise, the amount of an edge E2(x, y) in the middle region A2 and the amount of an edge E1(x, y) in the small region A1 are calculated.

The correcting function determining section 7 finds the parameter 'a' in the function Func (a correcting function) based on the amount of an edge, as described earlier, and determines the function Func (a correcting function). It should be noted that the function Func (a correcting function) may be determined so that the amount of an edge is reflected on the parameter 'limit' in the function Func.

The correcting section 3 corrects the spatial average value in each region by the function Func (a correcting function) determined by the correcting function determining section 7. The method of correction performs correction using the aforementioned correcting function.

The output image control section 4 issues a command to the regional pixel value extracting section 1 to extract pixel values of pixels in a region at a next layer each time the corrected spatial average value is successively input thereto. It also feeds the corrected spatial average value back to the correcting section 3 each time the value is input thereto. When Pout(x, y) for one pixel is input, it outputs Pout(x, y) as an output pixel value.

The fourth embodiment can suppress unsharpening of edges more, in addition to the effects in the first and second embodiments.

While several components may be configured in hardware, they also may be implemented by a computer program, as is obvious from the preceding description. In this case, a processor that is operated by programs stored in a program memory implements functions and/or operations similar to those in the aforementioned embodiments. It is also possible to implement part of functions of the aforementioned embodiments by a computer program.

Part or all of the aforementioned embodiments may be described as in the following Supplementary notes, although not limited thereto:

(Supplementary note 1) A noise reduction method comprising:

for each of multi-layer regions each containing a pixel of interest and having a successively reducing area, calculating a pixel statistic value of pixels in that region;

for each of successive layers, correcting the pixel statistic value for a region at a current layer using a corrected pixel statistic value for a region at a preceding layer having a greater area than that of the region at the current layer; and correcting said pixel of interest using a corrected pixel statistic value for a region with a smallest area.

(Supplementary note 2) The noise reduction method as recited in Supplementary note 1, comprising:

calculating edge information for a region at each layer; and correcting the pixel statistic value in the region at the current layer using the corrected pixel statistic value at a preceding layer and edge information at the preceding layer.

(Supplementary note 3) The noise reduction method as recited in Supplementary note 2, comprising:

applying weighting to the corrected pixel statistic value at the preceding layer according to the edge information at the preceding layer.

(Supplementary note 4) The noise reduction method as recited in Supplementary note 3, wherein:

in a case that the edge information for the region at the preceding layer exceeds a predetermined threshold, no correction is applied to the pixel statistic value at the current layer.

(Supplementary note 5) The noise reduction method as recited in any one of Supplementary notes 1 through 4, comprising:

modifying a parameter in the correcting function for correcting the pixel statistic value on a layer-by-layer basis.

(Supplementary note 6) The noise reduction method as recited in Supplementary note 5, comprising:

modifying the parameter in the correcting function for correcting the pixel statistic value according to the amount of change in the pixel value due to a noise in the region at the current layer.

(Supplementary note 7) The noise reduction method as recited in Supplementary note 5, comprising:

modifying the parameter in the correcting function for correcting the pixel statistic value on a layer-by-layer basis based on the edge information.

(Supplementary note 8) The noise reduction method as recited in any one of Supplementary notes 1 to 7, wherein:

the function for correcting the pixel statistic value is a function having such a property as to generate an output value coming closer to zero for an input value for the function closer to zero, and an output value coming closer to the input value for a greater absolute value of the input value.

(Supplementary note 9) The noise reduction method as recited in any one of Supplementary notes 1 to 8, wherein:

said pixel statistic value is a spatial average value of pixels in a region at each layer.

(Supplementary note 10) The noise reduction method as recited in Supplementary note 9, wherein:

said spatial average value is any one of an arithmetic mean value, a geometric mean value, and a weighted average value of pixels in a region at each layer.

(Supplementary note 11) A noise reduction apparatus comprising:

pixel statistic value calculating means for, for each of multi-layer regions each containing a pixel of interest and having a successively reducing area, calculating a pixel statistic value of pixels in that region; and correcting means for, for each of successive layers, correcting the pixel statistic value for a region at a current layer using a corrected pixel statistic value for a region at a preceding layer having a greater area than that of the region at the current layer, and correcting said pixel of interest using a corrected pixel statistic value for a region with a smallest area.

(Supplementary note 12) The noise reduction apparatus as recited in Supplementary note 11, comprising:

edge information calculating means for calculating edge information for a region at each layer, wherein said correcting means corrects the pixel statistic value in the region at the current layer using the corrected pixel statistic value at a preceding layer and edge information at the preceding layer.

(Supplementary note 13) The noise reduction apparatus as recited in Supplementary note 12, wherein:

said correcting means applies weighting to the corrected pixel statistic value at the preceding layer according to the edge information at the preceding layer.

(Supplementary note 14) The noise reduction apparatus as recited in Supplementary note 13, wherein:

in a case that the edge information for the region at the preceding layer exceeds a predetermined threshold, said correcting means applies no correction to the pixel statistic value at the current layer.

(Supplementary note 15) The noise reduction apparatus as recited in any one of Supplementary notes 11 to 14, wherein:

said correcting means modifies a parameter in the correcting function for correcting the pixel statistic value on a layer-by-layer basis.

(Supplementary note 16) The noise reduction apparatus as recited in Supplementary note 15, wherein:

said correcting means modifies the parameter in the correcting function for correcting the pixel statistic value according to the amount of change in the pixel value due to a noise in the region at the current layer.

(Supplementary note 17) The noise reduction apparatus as recited in Supplementary note 15, wherein:

said correcting means modifies the parameter in the correcting function for correcting the pixel statistic value on a layer-by-layer basis based on the edge information.

(Supplementary note 18) The noise reduction apparatus as recited in any one of Supplementary notes 11 to 17, wherein:

said correcting means corrects said pixel statistic value by a function having such a property as to generate an output value coming closer to zero for an input value closer to zero, and an output value coming closer to the input value for a greater absolute value of the input value.

(Supplementary note 19) The noise reduction apparatus as recited in any one of Supplementary notes 11 to 18, wherein:

said pixel statistic value calculating means calculates a spatial average value of pixels in a region at each layer as said pixel statistic value.

(Supplementary note 20) The noise reduction apparatus as recited in Supplementary note 19, wherein:

said spatial average value is any one of an arithmetic mean value, a geometric mean value, and a weighted average value of pixels in a region at each layer.

(Supplementary note 21) A program causing a computer to execute the processing of:

for each of multi-layer regions each containing a pixel of interest and having a successively reducing area, calculating a pixel statistic value of pixels in that region; and for each of successive layers, correcting the pixel statistic value for a region at a current layer using a corrected pixel statistic value for a region at a preceding layer having a greater area than that of the region at the current layer; and correcting said pixel of interest using a corrected pixel statistic value for a region with a smallest area.

While the present invention has been described with reference to preferred embodiments, the present invention is not necessarily limited to the embodiments described above, and may be practiced with several modifications within a scope of the technical idea thereof.

The present application claims priority based on Japanese Patent Application No. 2011-180637 filed on Aug. 22, 2011, disclosure of which is incorporated herein in its entirety.

REFERENCE SIGNS LIST

1 Regional pixel value extracting section
2 Spatial average value calculating section
3 Correcting section
4 Output image control section
5 Correcting function determining section
6 Edge information calculating section
7 Correcting function determining section

The invention claimed is:

1. A noise reduction method, comprising:
for each of multi-layer regions each containing a pixel of interest and having a successively reducing area, calculating a pixel statistic value of pixels in that region;
for each of successive layers, correcting the pixel statistic value for a region at a current layer using a corrected pixel statistic value for a region at a preceding layer having a greater area than that of the region at the current layer; and
correcting said pixel of interest using a corrected pixel statistic value for a region with a smallest area.

2. The noise reduction method according to claim 1, comprising:
calculating edge information for a region at each layer; and
correcting the pixel statistic value in the region at the current layer using the corrected pixel statistic value at a preceding layer and edge information at the preceding layer.

3. The noise reduction method according to claim 2, comprising:
weighting to the corrected pixel statistic value at the preceding layer according to the edge information at the preceding layer.

4. The noise reduction method according to claim 3, wherein:
in a case that the edge information for the region at the preceding layer exceeds a predetermined threshold, no correction is applied to the pixel statistic value at the current layer.

5. The noise reduction method according to claim 1, comprising:
modifying a parameter in the correcting function for correcting the pixel statistic value on a layer-by-layer basis.

6. The noise reduction method according to claim 5, comprising:
modifying the parameter in the correcting function for correcting the pixel statistic value according to the amount of change in the pixel value due to a noise in the region at the current layer.

7. The noise reduction method according to claim 5, comprising:
modifying the parameter in the correcting function for correcting the pixel statistic value on a layer-by-layer basis based on the edge information.

8. The noise reduction method according to claim 1, wherein:
the function for correcting the pixel statistic value is a function having such a property as to generate an output value coming closer to zero for an input value for the function closer to zero, and an output value coming closer to the input value for a greater absolute value of the input value.

9. The noise reduction method according to claim 1, wherein:
said pixel statistic value is a spatial average value of pixels in a region at each layer.

10. The noise reduction method according to claim 9, wherein:
said spatial average value is any one of an arithmetic mean value, a geometric mean value, and a weighted average value of pixels in a region at each layer.

11. A noise reduction apparatus, comprising:
a memory storing instructions;
one or more processors configured to execute the instructions to:
for each of multi-layer regions each containing a pixel of interest and having a successively reducing area, calculate a pixel statistic value of pixels in that region, and
for each of successive layers, correct the pixel statistic value for a region at a current layer using a corrected pixel statistic value for a region at a preceding layer having a greater area than that of the region at the current layer, and correct said pixel of interest using a corrected pixel statistic value for a region with a smallest area.

12. The noise reduction apparatus according to claim 11, wherein the one or more processors are further configured to execute the instructions to:
calculate edge information for a region at each layer, and
correct the pixel statistic value in the region at the current layer using the corrected pixel statistic value at a preceding layer and edge information at the preceding layer.

13. The noise reduction apparatus according to claim 12, wherein the one or more processors are further configured to execute the instructions to:
apply weighting to the corrected pixel statistic value at the preceding layer according to the edge information at the preceding layer.

14. The noise reduction apparatus according to claim 13, wherein the one or more processors are further configured to execute the instructions to:
in a case that the edge information for the region at the preceding layer exceeds a predetermined threshold, apply no correction to the pixel statistic value at the current layer.

15. The noise reduction apparatus according to claim 11, wherein the one or more processors are further configured to execute the instructions to:
modify a parameter in the correcting function for correcting the pixel statistic value on a layer-by-layer basis.

16. The noise reduction apparatus according to claim 15, wherein the one or more processors are further configured to execute the instructions to:
modify the parameter in the correcting function for correcting the pixel statistic value according to the amount of change in the pixel value due to a noise in the region at the current layer.

17. The noise reduction apparatus according to claim 15, wherein the one or more processors are further configured to execute the instructions to:
modify the parameter in the correcting function for correcting the pixel statistic value on a layer-by-layer basis based on the edge information.

18. The noise reduction apparatus according to claim 11, wherein the one or more processors are further configured to execute the instructions to:
   correct said pixel statistic value by a function having such a property as to generate an output value coming closer to zero for an input value closer to zero, and an output value coming closer to the input value for a greater absolute value of the input value.

19. The noise reduction apparatus according to claim 11, wherein the one or more processors are further configured to execute the instructions to:
   calculate a spatial average value of pixels in a region at each layer as said pixel statistic value.

20. A non-transitory computer readable storage medium storing program that, when executed by a computer, cause the computer to:
   for each of multi-layer regions each containing a pixel of interest and having a successively reducing area, calculating a pixel statistic value of pixels in that region;
   for each of successive layers, correcting the pixel statistic value for a region at a current layer using a corrected pixel statistic value for a region at a preceding layer having a greater area than that of the region at the current layer; and
   correcting said pixel of interest using a corrected pixel statistic value for a region with a smallest area.

* * * * *

UNITED STATES PATENT AND TRADEMARK OFFICE
CERTIFICATE OF CORRECTION

| | | |
|---|---|---|
| PATENT NO. | : 9,299,131 B2 | Page 1 of 1 |
| APPLICATION NO. | : 14/239577 | |
| DATED | : March 29, 2016 | |
| INVENTOR(S) | : Masato Toda | |

It is certified that error appears in the above-identified patent and that said Letters Patent is hereby corrected as shown below:

Claims
Claim 20, Col. 15, Line 15, "cause" should read as --causes--.

Signed and Sealed this
Seventh Day of June, 2016

Michelle K. Lee
*Director of the United States Patent and Trademark Office*